United States Patent
Kyono

(10) Patent No.: US 8,063,507 B2
(45) Date of Patent: Nov. 22, 2011

(54) MULTIPLE OUTPUT SWITCHING POWER SOURCE APPARATUS

(75) Inventor: Yoichi Kyono, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 264 days.

(21) Appl. No.: 12/442,824

(22) PCT Filed: Jun. 16, 2008

(86) PCT No.: PCT/JP2008/060982
§ 371 (c)(1),
(2), (4) Date: Mar. 25, 2008

(87) PCT Pub. No.: WO2009/001703
PCT Pub. Date: Dec. 31, 2008

(65) Prior Publication Data
US 2010/0109434 A1 May 6, 2010

(30) Foreign Application Priority Data
Jun. 28, 2007 (JP) ................................. 2007-170906

(51) Int. Cl.
*H02J 1/00* (2006.01)
*H02M 3/335* (2006.01)
(52) U.S. Cl. .......................... 307/31; 363/21.12; 307/17
(58) Field of Classification Search .................. 323/267; 363/20, 21.01, 21.04, 21.1, 21.12, 21.18, 363/16; 307/11, 17, 31
See application file for complete search history.

(56) References Cited

U.S. PATENT DOCUMENTS

| 4,665,473 | A  | * | 5/1987  | Onda et al. ................. | 363/21.04 |
| 7,315,460 | B2 |   | 1/2008  | Kyono                        |           |
| 7,339,799 | B2 |   | 3/2008  | Osaka et al.                 |           |
| 7,375,987 | B2 |   | 5/2008  | Kyono                        |           |
| 7,619,903 | B2 | * | 11/2009 | Choi ............................. | 363/20 |
| 2007/0138870 | A1 |   | 6/2007  | Kyono                     |           |

FOREIGN PATENT DOCUMENTS

JP  1 72726   5/1989
JP  7 288976  10/1995

(Continued)

OTHER PUBLICATIONS

U.S. Appl. No. 12/089,054, filed Apr. 3, 2008, Kyono.
U.S. Appl. No. 12/528,461, filed Aug. 25, 2009, Kyono.
U.S. Appl. No. 12/663,290, filed Dec. 7, 2009, Kyono.

(Continued)

*Primary Examiner* — Gary L Laxton
(74) *Attorney, Agent, or Firm* — Oblon, Spivak, McClelland, Maier & Neustadt, L.L.P.

(57) ABSTRACT

A multiple output switching power source apparatus includes first and second transformers each having a primary winding, a first secondary winding, and a second secondary winding; a first control circuit adjusting a time for applying a DC voltage to the primary winding of the first transformer; a first rectifying-smoothing circuit rectifying and smoothing a voltage generated at the first secondary winding of the first transformer and providing a first output voltage; a second control circuit adjusting a time for applying the DC voltage to the primary winding of the second transformer; a second rectifying-smoothing circuit rectifying and smoothing a voltage generated at the first secondary winding of the second transformer and providing a second output voltage; and a third rectifying-smoothing circuit rectifying and smoothing a voltage across a series winding having the second secondary windings of the first and second transformers and providing a third output voltage.

4 Claims, 11 Drawing Sheets

FOREIGN PATENT DOCUMENTS

| | | |
|---|---|---|
| JP | 8 107028 | 4/1996 |
| JP | 2002 325449 | 11/2002 |
| JP | 2003 259644 | 9/2003 |
| JP | 2004-274864 | 9/2004 |

OTHER PUBLICATIONS

U.S. Appl. No. 12/667,973, filed Jan. 6, 2010, Kyono.
U.S. Appl. No. 12/990,390, filed Oct. 29, 2010, Kyono.

* cited by examiner

US 8,063,507 B2

MULTIPLE OUTPUT SWITCHING POWER SOURCE APPARATUS

TECHNICAL FIELD

The present invention relates to a multiple output switching power source apparatus having a plurality of outputs.

BACKGROUND TECHNOLOGY

FIG. 1 is a circuit diagram illustrating a configuration of a multiple output switching power source apparatus according to a related art. In this multiple output switching power source apparatus, an input voltage Vin is a DC voltage produced by rectifying and smoothing an AC voltage of a commercial power source. The input voltage Vin is connected in series with a primary winding P1 of a transformer T1 and a switching element Q1 made of, for example, a MOSFET. A control circuit 11 controls ON/OFF of the switching element Q1.

On the secondary side of the transformer T1, a secondary winding S1 is wound to generate a voltage having a phase opposite to that of a voltage of the primary winding P1 of the transformer T1 and is connected to a rectifying-smoothing circuit. The rectifying-smoothing circuit consists of a diode D1 and a smoothing capacitor C1, to rectify and smooth the voltage induced by the secondary winding S1 of the transformer T1 and provide a first output voltage Vo1 from a first output terminal.

The converter for providing the first output voltage Vo1 is generally known as a flyback converter that accumulates exciting energy in the primary winding P1 of the transformer T1 during an ON period of the switching element Q1, and after the switching element Q2 turns off, discharges the energy through the diode D1 to the output. A feedback circuit 10 feeds back an error signal between the first output voltage Vo1 and a reference voltage to the control circuit 11. According to the error signal, the control circuit 11 adjusts an ON width of the switching element Q1, thereby controlling the first output voltage Vo1 to a predetermined value.

A second output voltage Vo2 and a third output voltage Vo3 are provided by DC/DC converters 21 and 22 that are, for example, step-down choppers connected to the first output terminal of the flyback converter.

This multiple output switching power source apparatus is capable of accurately providing the three output voltages Vo1, Vo2, and Vo3. To provide the second and third output voltages Vo2 and Vo3, however, the DC/DC converters 21 and 22 should have parts such as switching elements, choke coils, and control ICs that increase costs and packaging areas. In addition, the switching elements must turn on/off paths for passing a large current, to cause excessive switching loss and noise. If the outputs must be insulated from one another to prevent interference among circuits, the circuit configuration of the related art is inapplicable.

FIG. 2 is a circuit diagram illustrating a configuration of a multiple output switching power source apparatus according to another related art. This multiple output switching power source apparatus consists of a first converter including a transformer T1, a switching element Q1, a rectifying-smoothing circuit (D1, C1), a feedback circuit 10-1, and a control circuit 11-1, a second converter including a transformer T2, a switching element Q2, a rectifying-smoothing circuit (D2, C2), a feedback circuit 10-2, and a control circuit 11-2, and a third converter including a transformer T3, a switching element Q3, a rectifying-smoothing circuit (D3, C3), a feedback circuit 10-3, and a control circuit 11-3. Namely, each output consists of a flyback converter. This circuit configuration can insulate outputs from one another.

DISCLOSURE OF INVENTION

Like the multiple output switching power source apparatus illustrated in FIG. 1, the multiple output switching power source apparatus illustrated in FIG. 2 should equip the switching element, transformer, and control IC for each of the outputs, and in addition, should secure an insulating distance between the primary and secondary sides of the transformer of each output. Due to this, the multiple output switching power source apparatus of FIG. 2 needs a larger packaging space than the apparatus of FIG. 1.

Still another related art is described in, for example, Japanese Unexamined Patent Application Publication No. 2003-259644.

As explained above, the multiple output switching power source apparatus of the related art that arranges the regulators (DC/DC converters 21 and 22) on the secondary side increases noise and loss due to the regulators. It also increases costs and packaging areas due to the additional parts. Further, it is inapplicable if the outputs must be insulated from one another.

The configuration that arranges converters for outputs, respectively, needs a larger packaging space than the configuration that arranges the regulators on the secondary side.

MEANS TO SOLVE THE PROBLEMS

The present invention provides a multiple output switching power source apparatus that employs an inexpensive circuit configuration to provide stabilized outputs.

To solve the above-mentioned problems, a first technical aspect of the present invention provides a multiple output switching power source apparatus comprising first and second transformers each at least having a primary winding, a first secondary winding, and a second secondary winding; a first control circuit to adjust a time for applying a DC voltage to the primary winding of the first transformer; a first rectifying-smoothing circuit to rectify and smooth a voltage generated by the first secondary winding of the first transformer and provide a first output voltage; a second control circuit to adjust a time for applying the DC voltage to the primary winding of the second transformer; a second rectifying-smoothing circuit to rectify and smooth a voltage generated by the first secondary winding of the second transformer and provide a second output voltage; and a third rectifying-smoothing circuit to rectify and smooth a voltage across a series winding having the second secondary windings of the first and second transformers and provide a third output voltage.

According to a second technical aspect of the present invention, the above-mentioned multiple output switching power source apparatus comprises a first switching element to be turned on/off by the first control circuit; a second switching element to be turned on/off by the second control circuit; and a third control circuit to generate, according to the third output voltage of the third rectifying-smoothing circuit, ON-timing control signals that change a time between the timing of turning on the first switching element and the timing of turning on the second switching element. The first and second control circuits turn on/off the switching elements at the same switching frequency according to the ON-timing control signals from the third control circuit.

According to a third technical aspect of the present invention, the multiple output switching power source apparatus of the first technical aspect comprises a first switching element to be turned on/off by the first control circuit; a second switching element to be turned on/off by the second control circuit; and a third control circuit to generate, according to the third output voltage of the third rectifying-smoothing circuit, an ON-timing control signal that changes the timing of turning on the second switching element. The second control circuit operates in synchronization with a switching frequency of the first control circuit and turns on/off the second switching element according to the ON-timing control signal from the third control circuit.

According to a fourth technical aspect of the present invention that is based on the second technical aspect, the third control circuit has an oscillation circuit to generate a pulse voltage at predetermined intervals; a first trigger generation circuit to generate a first trigger in synchronization with the pulse voltage from the oscillation circuit; and a second trigger generation circuit to generate a second trigger when a time period corresponding to the third output voltage of the third rectifying-smoothing circuit passes after the generation of the pulse voltage by the oscillation circuit. The first trigger is provided to the first control circuit as the ON-timing control signal and the second trigger to the second control circuit as the same.

According to a fifth technical aspect of the present invention that is based on the third technical aspect, the third control circuit has a second trigger generation circuit to generate a second trigger when a time period corresponding to the third output voltage of the third rectifying-smoothing circuit passes after the first switching element is turned on or off. The second trigger is provided as the ON-timing control signal to the second control circuit.

BEST MODE OF IMPLEMENTING INVENTION

Multiple output switching power source apparatuses according to embodiments of the present invention will be explained in detail with reference to the drawings.

First Embodiment

Figure 3:
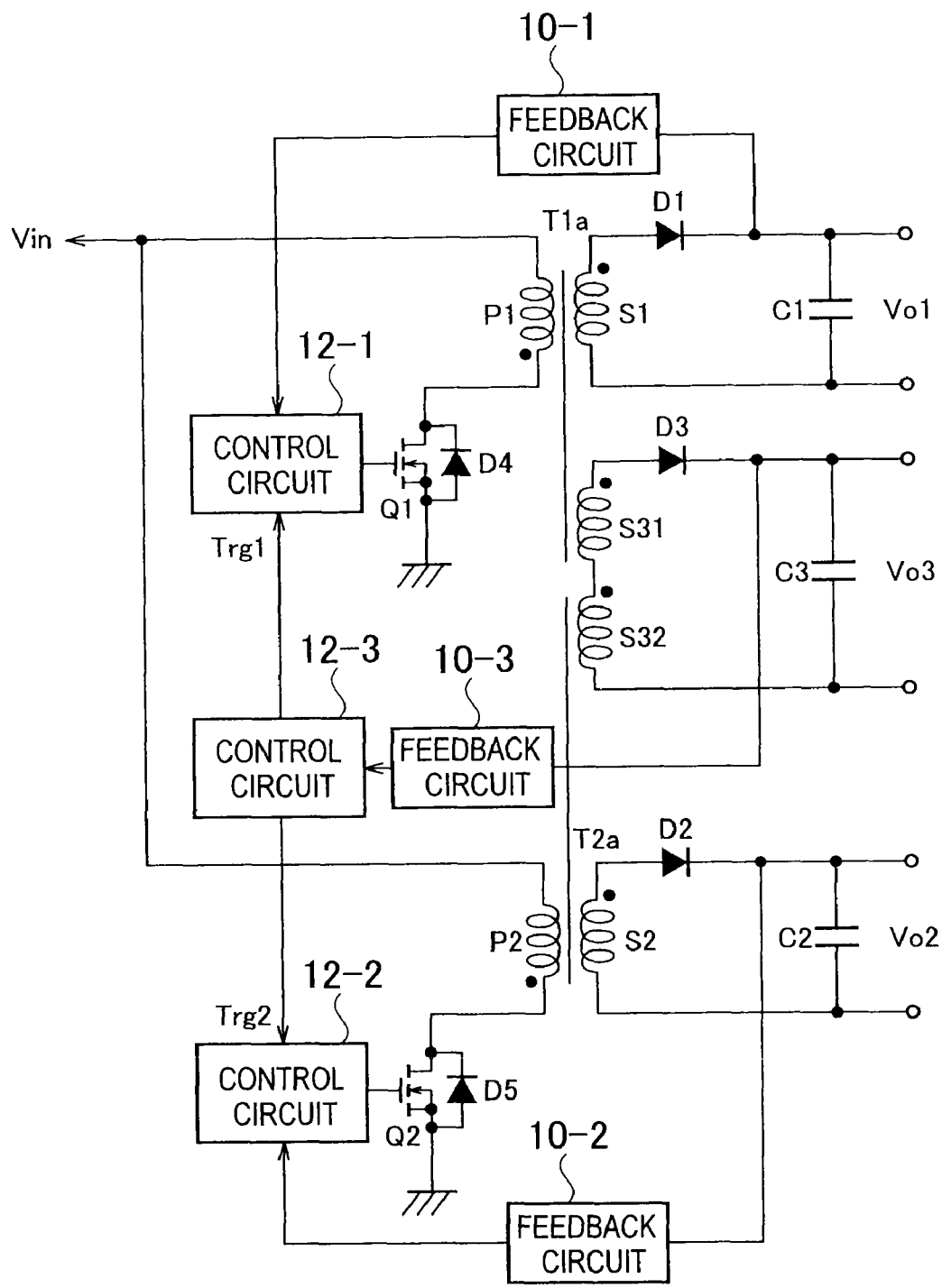
FIG. 3 is a circuit diagram illustrating a multiple output switching power source apparatus according to a first embodiment of the present invention.

FIG. 3 is a circuit diagram illustrating a configuration of a multiple output switching power source apparatus according to the first embodiment of the present invention. In the multiple output switching power source apparatus, a transformer T1*a* (first transformer) has a primary winding P1, a first secondary winding S1, and a second secondary winding S31. A transformer T2*a* (second transformer) has a primary winding P2, a first secondary winding S2, and a second secondary winding S32.

An input voltage Vin is a DC voltage produced by rectifying and smoothing an AC voltage of a commercial power source. The input voltage Vin is connected to the primary winding P1 of the transformer T1*a* and a switching element Q1 made of, for example, a MOSFET that are connected in series. A control circuit 12-1 (first control circuit) controls ON/OFF of the switching element Q1 at a predetermined frequency, to convert the DC voltage Vin into an AC voltage to be applied to the primary winding P1 of the first transformer T1*a*.

The input voltage Vin is connected to the primary winding P2 of the transformer T2*a* and a switching element Q2 made of, for example, a MOSFET that are connected in series. A control circuit 12-2 (second control circuit) controls ON/OFF of the switching element Q2 at the predetermined frequency, to convert the DC voltage Vin into an AC voltage to be applied to the primary winding P2 of the second transformer T2*a*.

A diode D4 (D5) is connected between the drain and source of the switching element Q1 (Q2). The diode D4 (D5) may be parasitic capacitance existing between the drain and source of the switching element Q1 (Q2).

On the secondary side of the transformer T1*a*, there is a rectifying-smoothing circuit (first rectifying-smoothing circuit) connected to the first secondary winding S1 that is wound so as to generate a voltage whose phase is opposite to that of a voltage of the primary winding P1 of the transformer T1*a*. The rectifying-smoothing circuit has a diode D1 and a smoothing capacitor C1, rectifies and smoothes a voltage induced by the first secondary winding S1 of the transformer T1*a*, and provides a first output voltage Vo1 from a first output terminal.

On the secondary side of the transformer T2*a*, there is a rectifying-smoothing circuit (second rectifying-smoothing circuit) connected to the first secondary winding S2 that is wound so as to generate a voltage whose phase is opposite to that of a voltage of the primary winding P2 of the transformer T2*a*. The rectifying-smoothing circuit has a diode D2 and a smoothing capacitor C2, rectifies and smoothes a voltage induced by the first secondary winding S2 of the transformer T2*a*, and provides a second output voltage Vo1 from a second output terminal.

The second secondary winding S31 of the transformer T1a is wound so as to generate a voltage whose phase is the same as that of a voltage of the first secondary winding S1 of the transformer T1a. The second secondary winding S32 of the transformer T2a is wound so as to generate a voltage whose phase is the same as that of a voltage of the first secondary winding S2 of the transformer T2a.

The second secondary winding S31 of the transformer T1a and the second secondary winding S32 of the transformer T2a are connected in series to form a series winding. Between ends of the series winding, there is connected a rectifying-smoothing circuit (third rectifying-smoothing circuit) having a diode D3 and a smoothing capacitor C3. The rectifying-smoothing circuit provides a voltage across the smoothing capacitor C3 as a third output voltage Vo3 from a third output terminal.

A feedback circuit 10-1 feeds back an error signal between the first output voltage Vo1 and a reference voltage to the control circuit 12-1 on the primary side. According to the error signal, the control circuit 12-1 adjusts an ON width of the switching element Q1, thereby controlling the first output voltage Vo1 to a predetermined voltage. A feedback circuit 10-2 feeds back an error signal between the second output voltage Vo2 and a reference voltage to the control circuit 12-2 on the primary side. According to the error signal, the control circuit 12-2 adjusts an ON width of the switching element Q2, thereby controlling the second output voltage Vo2 to a predetermined voltage.

A feedback circuit 10-3 feeds back an error signal between the third output voltage vo3 and a reference voltage to a control circuit 12-3 on the primary side. According to the error signal, the control circuit 12-3 (third control circuit) generates triggers Trg1 (first trigger) and Trg2 (second trigger) serving as ON-timing control signals that changes a time between the timing of turning on the switching element Q1 and the timing of turning on the switching element Q2, outputs the trigger Trg1 to the control circuit 12-1, and outputs the trigger Trg2 to the control circuit 12-2.

Figure 4:
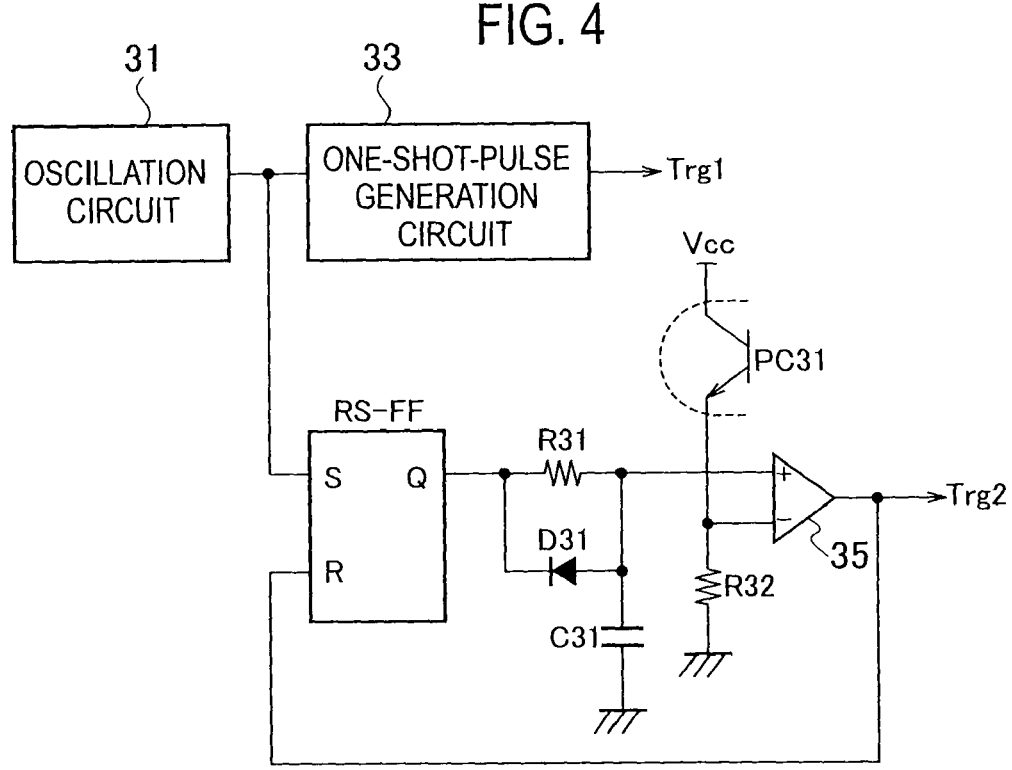
FIG. 4 is an internal circuit diagram illustrating a control circuit 12-3 of the multiple output switching power source apparatus according to the first embodiment.

FIG. 4 is an internal circuit diagram illustrating the control circuit 12-3 of the multiple output switching power source apparatus according to the first embodiment. The control circuit 12-3 has an oscillation circuit 31, a one-shot-pulse generation circuit 33 (first trigger generation circuit), a comparator 35 (second trigger generation circuit), and an RS flip-flop circuit RS-FF. Between an output terminal Q of the flip-flop circuit RS-FF and a non-inverting input terminal of the comparator 35, there is connected a parallel circuit including a resistor R31 and a diode D31. A capacitor C31 is connected between the non-inverting input terminal of the comparator 35 and the ground. Between a power source Vcc and the ground, there is connected a series circuit including a photocoupler PC31 (phototransistor part) and a resistor R32.

The photocoupler PC31 contributes to form the feedback circuit 10-3 and changes a current according to the error signal between the third output voltage Vo3 and the reference voltage. A connection point of the photocoupler PC31 and resistor R32 is connected to an inverting input terminal of the comparator 35. An output terminal of the comparator 35 outputs the trigger Trg2 and is connected to a reset terminal R of the flip-flop circuit RS-FF.

Figure 5:
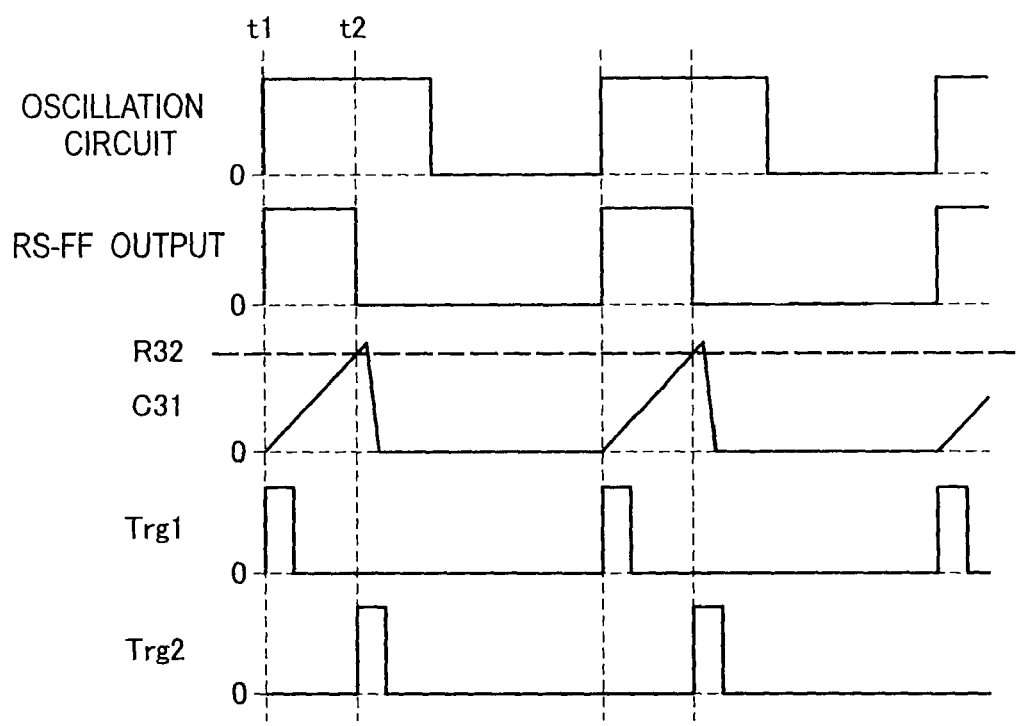
FIG. 5 is a timing chart illustrating operation of the control circuit 12-3 illustrated in FIG. 4.

Operations of the control circuit 12-3 as illustrated in FIG. 4 will be explained with reference to the timing chart of FIG. 5.

First, at time t1, the oscillation circuit 31 generates a pulse voltage at predetermined intervals. At a rise of the pulse voltage from the oscillation circuit 31, the one-shot-pulse generation circuit 33 generates and outputs the trigger Trg1 that is a one-shot pulse. The flip-flop circuit RS-FF receives the pulse voltage from the oscillation circuit 31 at a set terminal S and provides a high-level output from the output terminal Q in synchronization with a rise of the pulse voltage.

The high-level output from the output terminal Q gradually charges the capacitor C31 through the resistor R31. An output current of the photocoupler PC31 changes according to an error voltage between the third output voltage Vo3 and the reference voltage. This results in changing a voltage generated by the resistor R32.

At time t2, the voltage of the capacitor C31 reaches the voltage of the resistor R32 and the comparator 35 provides a high-level output as the trigger Trg2.

In response to the high-level output of the comparator 35, the flip-flop RS-FF provides a low-level output and the voltage of the capacitor C31 is discharged through the diode D31 so that the comparator 35 provides a low-level output.

The trigger Trg2 is a pulse voltage generated according to a discharge time of the capacitor C31 and each response time of the flip-flop RS-FF and comparator 35. The above-mentioned operations are repeated in synchronization with the pulse voltage provided by the oscillation circuit 31.

In this way, the feedback signal from the feedback circuit 10-3 changes the voltage generated by the resistor R32, to change a time in which the voltage of the capacitor C31 reaches the voltage of the resistor R32. Namely, a time (t2-t1) between the timing t1 of the trigger Trg1 and the timing t2 of the trigger Trg2 is adjustable.

Figure 6:
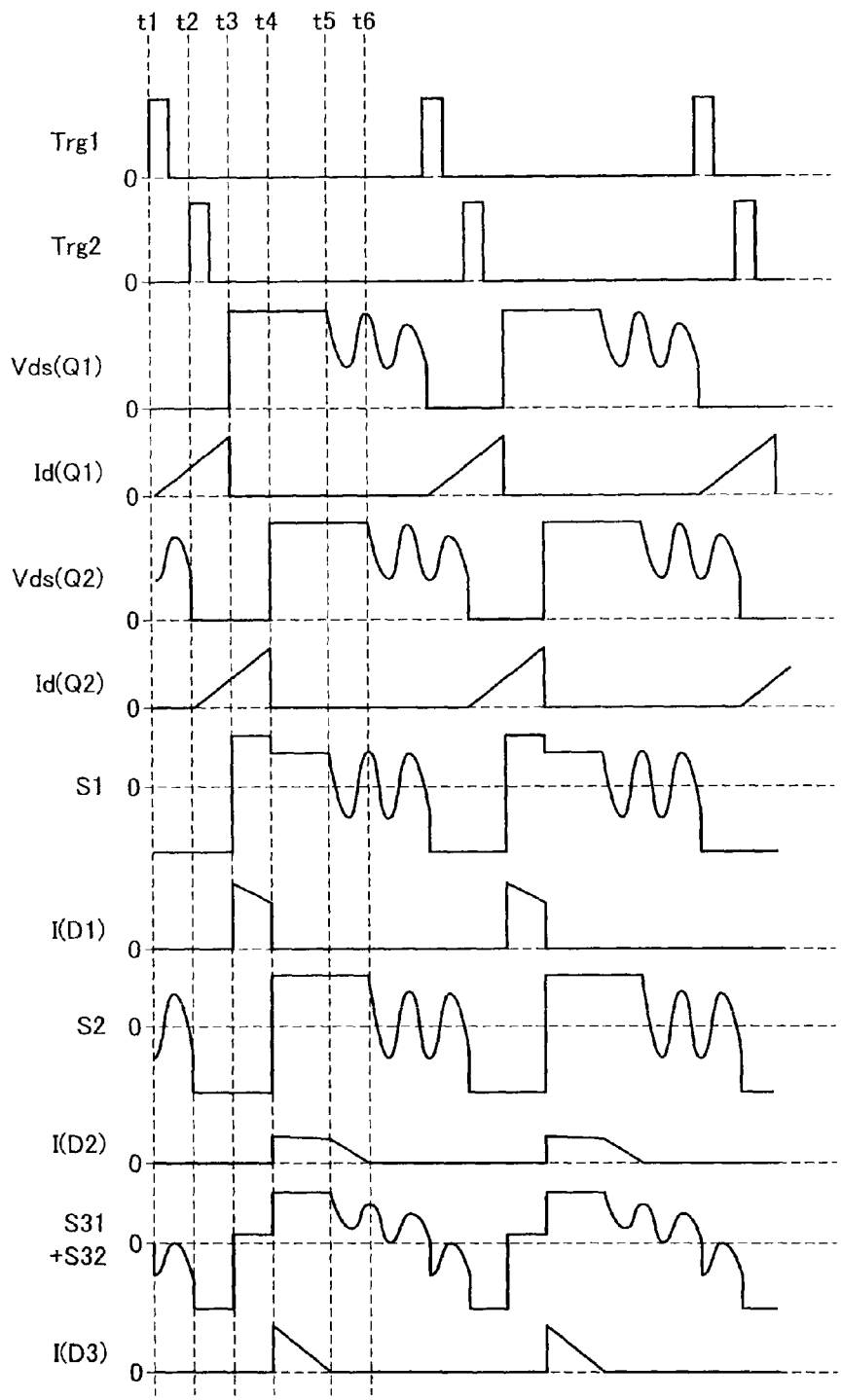
FIG. 6 is a waveform diagram illustrating operation under high load of the multiple output switching power source apparatus according to the first embodiment of the present invention.

FIG. 6 is a waveform diagram illustrating operation under high load of the multiple output switching power source apparatus according to the first embodiment of the present invention. Namely, the illustrated operational waveforms are those when load connected to the third output terminal is high.

With reference to FIG. 6, operation under high load of the multiple output switching power source apparatus according to the first embodiment will be explained.

In FIG. 6, Trg1 and Trg2 are the triggers, Vds(Q1) is a drain-source voltage of the switching element Q1, Id(Q1) is a drain current of the switching element Q1, Vds(Q2) is a drain-source voltage of the switching element Q2, Id(Q2) is a drain current of the switching element Q2, S1 is a voltage across the first secondary winding S1 of the transformer T1a, S2 is a voltage across the first secondary winding S2 of the transformer T2a, S31+S32 is a voltage across the second secondary windings S31 and S32, I(D1) is a current passing through the diode D1, I(D2) is a current passing through the diode D2, and I(D3) is a current passing through the diode D3.

First, at time t1, the control circuit 12-3 provides the control circuit 12-1 with the trigger Trg1 as an ON trigger signal. Receiving the trigger Trg1, the control circuit 12-1 provides the gate terminal of the switching element Q1 with a gate signal. This turns on the switching element Q1 to provide an excitation current of the primary winding P1 of the transformer T1a as the drain current Id(Q1).

At time t2, the control circuit 12-3 provides the control circuit 12-2 with the trigger Trg2 as an ON trigger signal. Receiving the trigger Trg2, the control circuit 12-2 provides the gate terminal of the switching element Q2 with a gate signal. This turns on the switching element Q2 to provide an excitation current of the primary winding P2 of the transformer T2a as the drain current Id(Q2).

At time t3, the switching element Q1 turns off, the voltage of the first secondary winding S1 of the transformer T1a reverses, and power is supplied through the diode D1 to the first output terminal. At this time, the voltage of the second secondary winding S31 of the transformer T1a also reverses.

However, the switching element Q2 is ON so that a negative voltage is induced at the first secondary winding S2 of the transformer T2a. Accordingly, a voltage on the anode side of the diode D3 is lower than the third output voltage Vo3, and therefore, no energy is discharged to the third output terminal.

At time t4, the switching element Q2 turns off and the voltage of the first secondary winding S2 of the transformer T2a reverses. At this time, the voltage of the second secondary winding S32 of the transformer T2a also reverses, and therefore, the voltage of the second secondary winding S31 of the transformer T1a and the voltage of the second secondary winding S32 of the transformer T2a are added together. As results, the voltage on the anode side of the diode D3 becomes higher than the third output voltage Vo3, and therefore, energy is discharged to the third output terminal.

The current I(D3) passing through the diode D3 corresponds to the remaining energy of the transformer T1a. The current I(D2) passing through the diode D2 corresponds to energy obtained by subtracting the energy discharged through the diode D3 to the third output terminal from the energy of the transformer T2a. The voltage of the second secondary winding S32 of the transformer T2a is a winding ratio times the voltage of the first secondary winding S2 that is the sum of the second output voltage Vo2 and a forward voltage of the diode D2.

The voltage of the second secondary winding S31 of the transformer T1a is a voltage obtained by subtracting the voltage of the second secondary winding S32 of the transformer T2a from the sum of the third output voltage Vo3 and a forward voltage of the diode D3. Accordingly, the voltage of the first secondary winding S1 of the transformer T1a is clamped by a voltage a winding ratio times the voltage of the second secondary winding S31. The voltage of the first secondary winding S1, therefore, becomes lower than the first output voltage Vo1 to terminate the energy discharge to the first output terminal.

At time t5, the discharge of the energy accumulated in the transformer T1a completes and the voltage induced at the first secondary winding S1 of the transformer T1a gradually decreases. Then, the voltage on the anode side of the diode D3 becomes lower than the third output voltage Vo3 and the diode D3 turns off. The energy accumulated in the transformer T2a is discharged through the diode D2 only to the second output terminal.

At time t6, the discharge of the energy accumulated in the transformer T2a ends and the discharge of the energy through the diode D2 to the second output terminal completes.

Figure 7:
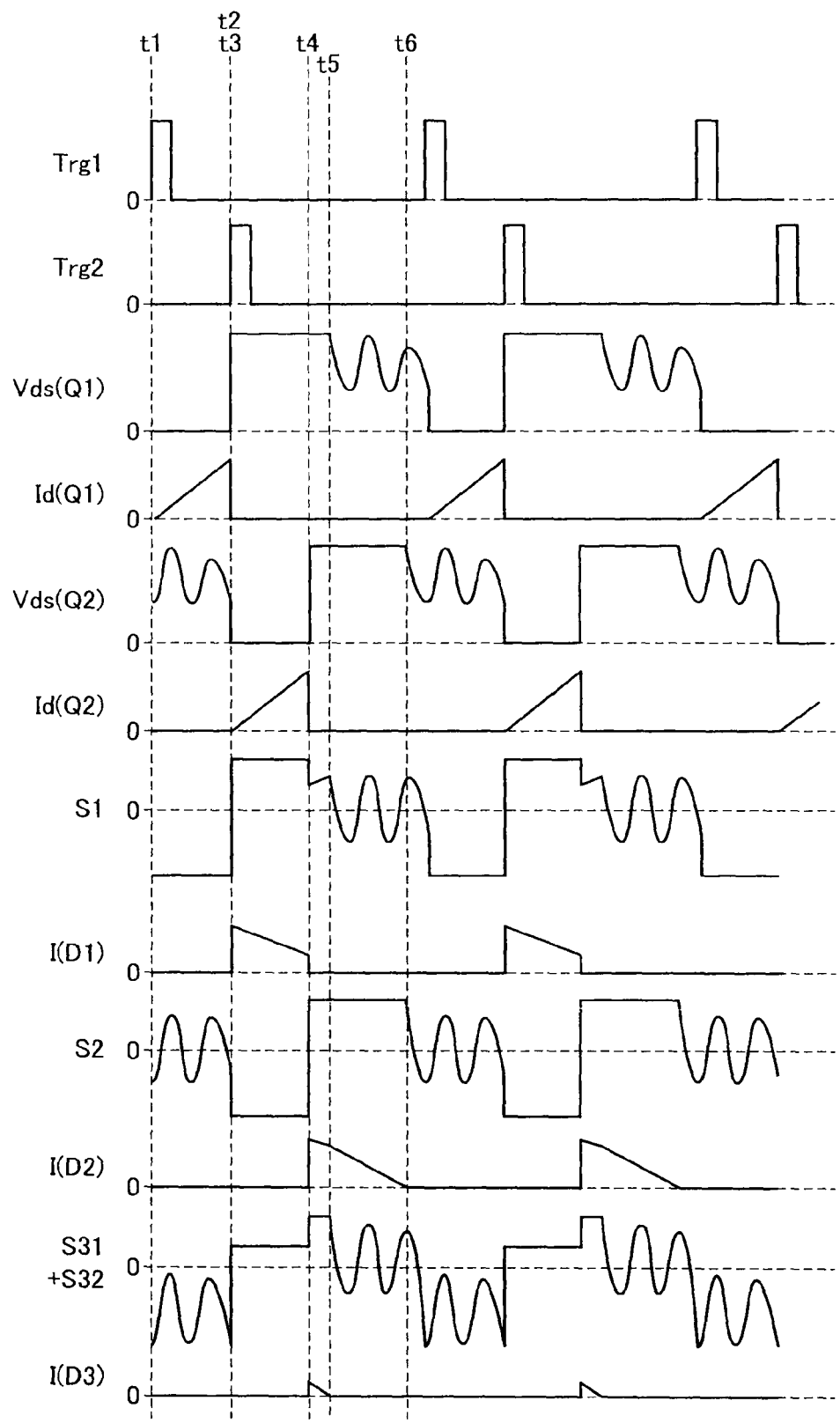
FIG. 7 is a waveform diagram illustrating operation under low load of the multiple output switching power source apparatus according to the first embodiment of the present invention.

FIG. 7 is a waveform diagram illustrating operation under low load of the multiple-output switching power source apparatus according to the first embodiment of the present invention. The operational waveforms illustrated in FIG. 7 are those when load connected to the third output terminal is low.

State changes from time t1 to t6 on the operational waveforms illustrated in FIG. 7 are similar to those of FIG. 6 under high load and operation in each period is similar to that of FIG. 6 under high load.

According to the low load operation of FIG. 7, the period of t1 to t2 from when the trigger Trg1 is provided to when the trigger Trg2 is provided is longer than that of the high load operation of FIG. 6. Accordingly, time t4 when the switching element Q2 turns off and the transformer T2a starts to discharge energy is delayed to shorten a period of t4 to t5 in which the energy discharge of the transformer T1a overlaps the energy discharge of the transformer T2a, thereby reducing the energy discharged to the third output terminal.

In this way, energy discharge to the third output terminal is carried out in a period in which the energy discharge period of the transformer T1a overlaps that of the transformer T2a. Accordingly, the error signal fed back from the feedback circuit 10-3 is used to shift the timing the control circuit 12-3 outputs the triggers Trg1 and Trg2, to thereby adjust a period in which the energy discharge period of the transformer T1a overlaps that of the transformer T2a and control the third output voltage Vo3.

Figure 1:
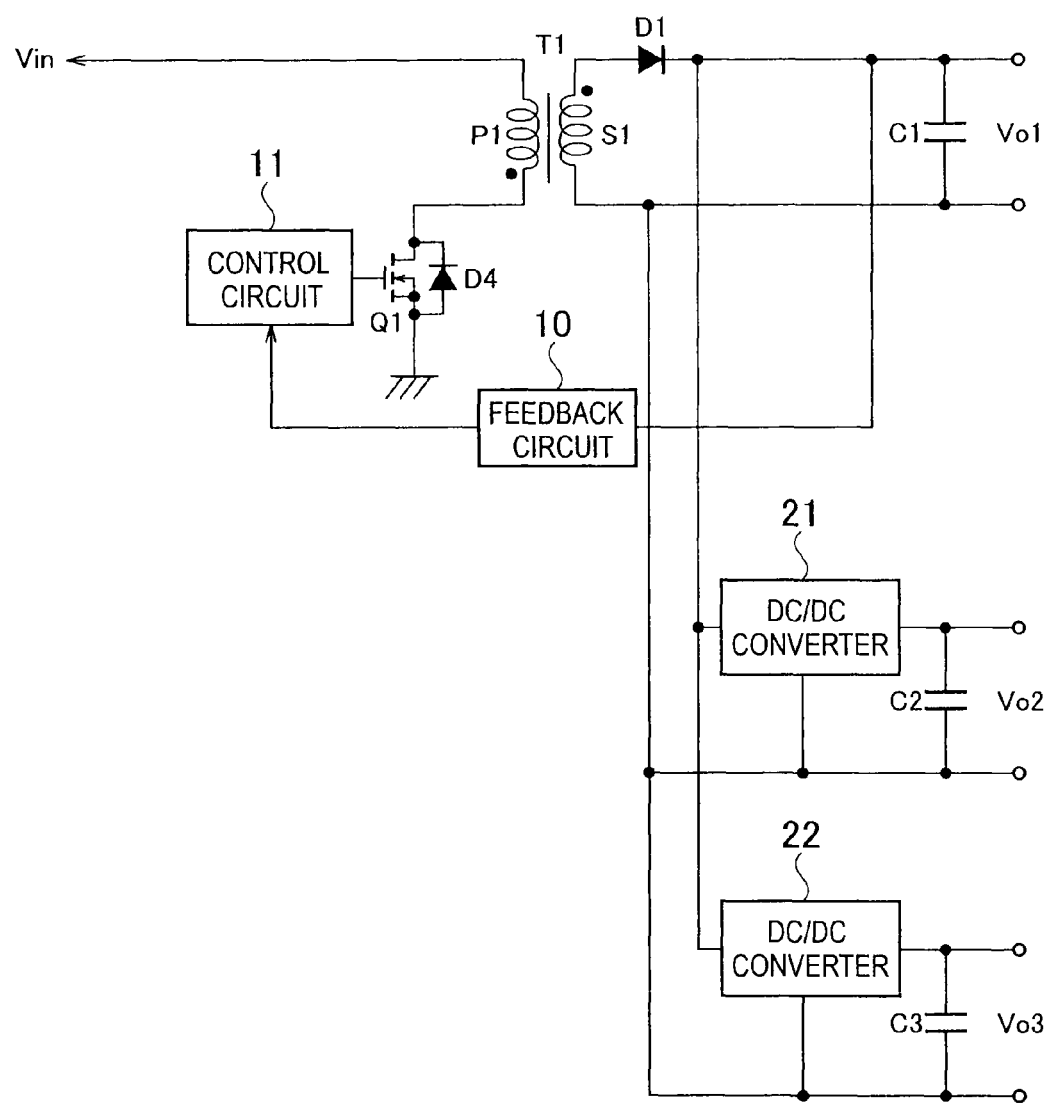
FIG. 1 is a circuit diagram illustrating a configuration of a multiple output switching power source apparatus according to a related art.
Figure 2:
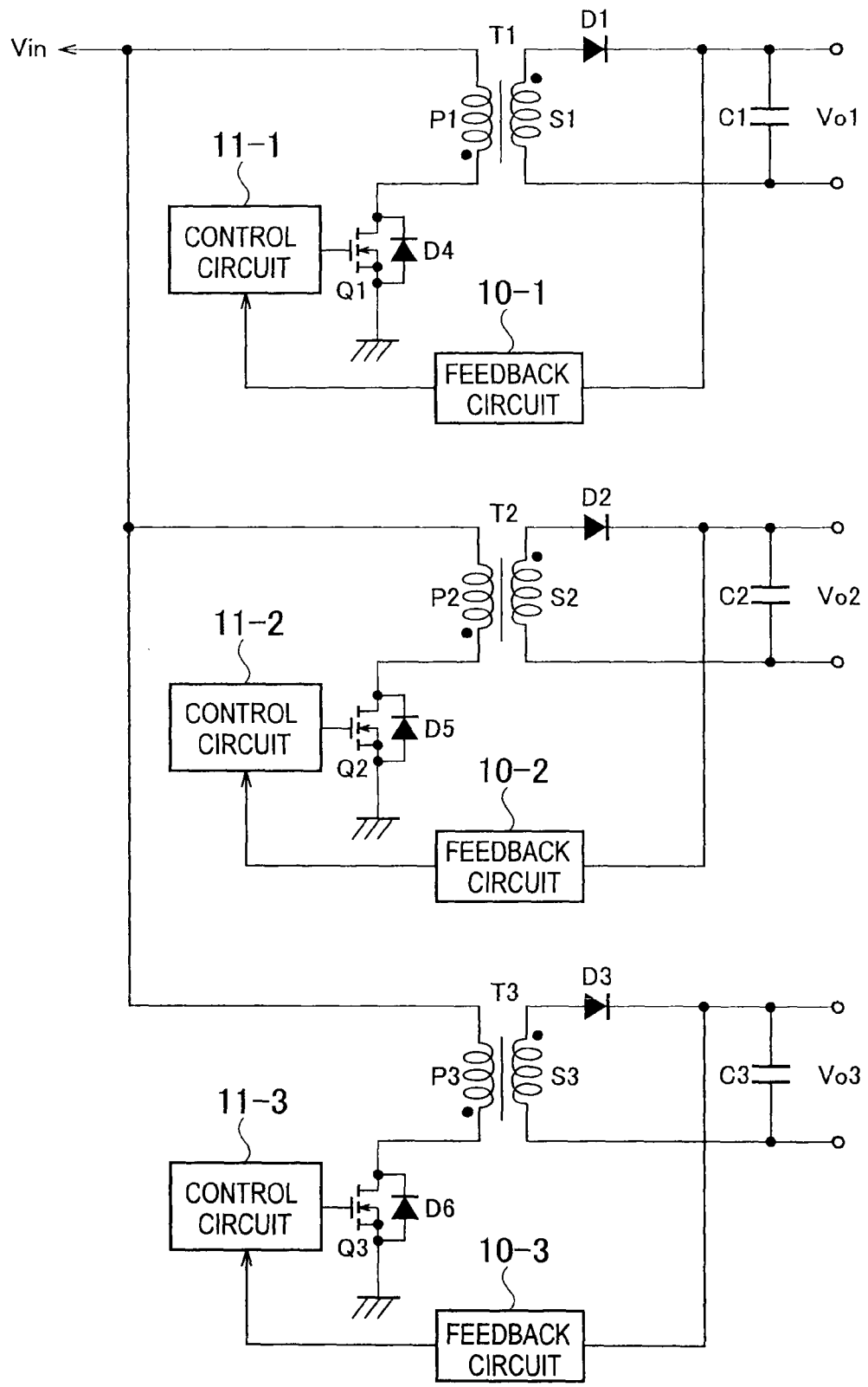
FIG. 2 is a circuit diagram illustrating a configuration of a multiple output switching power source apparatus according to another related art.

The multiple-output switching power source apparatus according to the first embodiment can remove one transformer T3 and one switching element Q3 from the three-converter-type multiple output switching power source apparatus of the related art illustrated in FIG. 2. The multiple output switching power source apparatus of the first embodiment employs such an inexpensive circuit configuration and is capable of stabilizing the three outputs.

Second Embodiment

Figure 8:
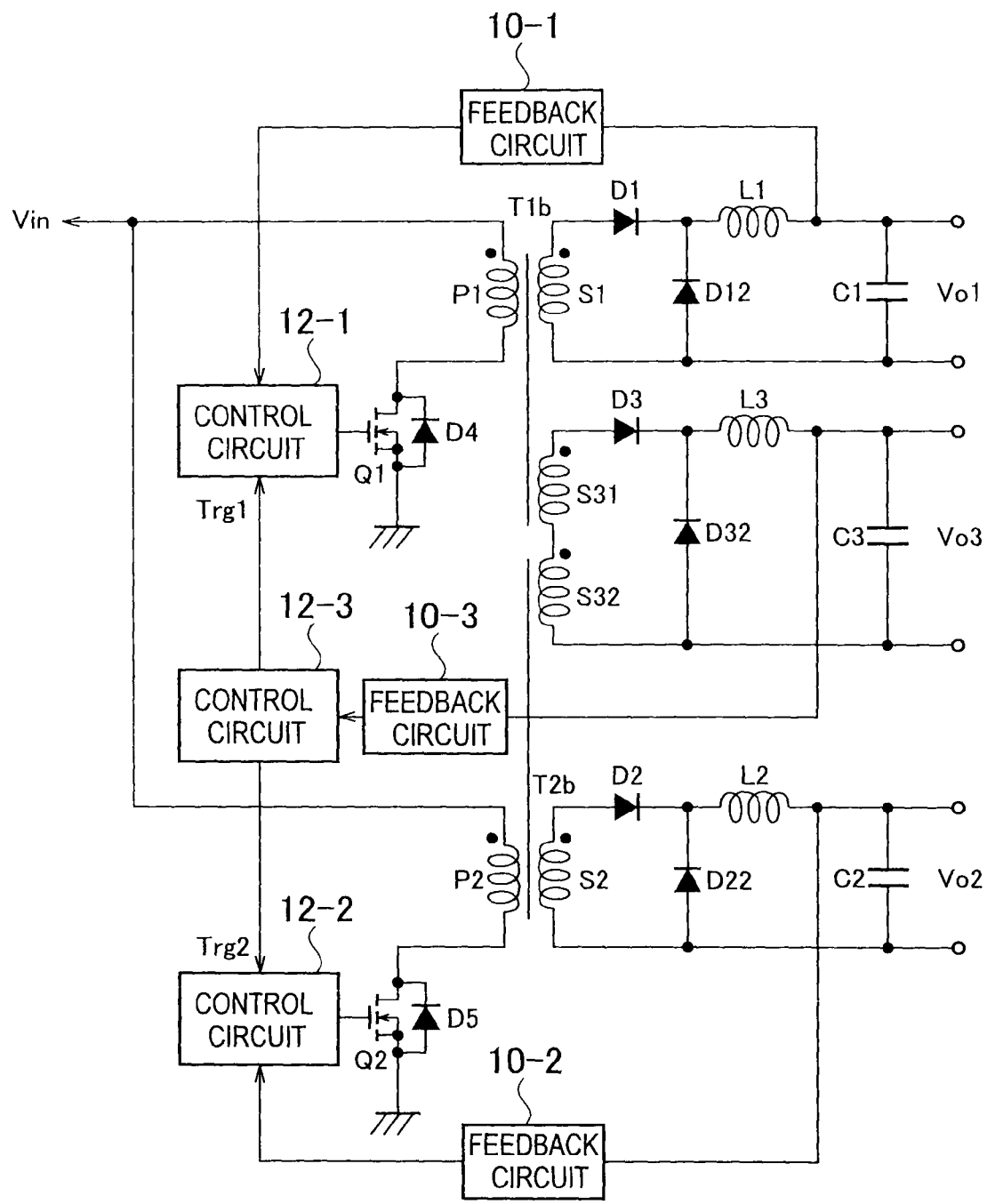
FIG. 8 is a circuit diagram illustrating a configuration of a multiple output switching power source apparatus according to a second embodiment of the present invention.

FIG. 8 is a circuit diagram illustrating a configuration of a multiple output switching power source apparatus according to the second embodiment of the present invention. The multiple output switching power source apparatus of the second embodiment illustrated in FIG. 8 differs from the multiple output switching power source apparatus of the first embodiment illustrated in FIG. 3 in the below-mentioned configuration. Only the different configuration will be explained.

On the secondary side of a transformer T1b, there is a rectifying-smoothing circuit connected to a first secondary winding S1 that is wound to generate a voltage whose phase is the same as that of the voltage of a primary winding P1 of the transformer T1b. The rectifying-smoothing circuit having a diode D1, a choke coil L1, a flywheel diode D12, and a smoothing capacitor C1. A voltage across the smoothing capacitor C1 is provided as a first output voltage Vo1 from a first output terminal.

On the secondary side of a transformer T2b, there is a rectifying-smoothing circuit connected to a first secondary winding S2 that is wound to generate a voltage whose phase is the same as that of the voltage of a primary winding P2 of the transformer T2b. The rectifying-smoothing circuit having a diode D2, a choke coil L2, a flywheel diode D22, and a smoothing capacitor C2. A voltage across the smoothing capacitor C2 is provided as a second output voltage Vo2 from a second output terminal.

Between ends of a series winding including a second secondary winding S31 of the transformer T1b and a second secondary winding S32 of the transformer T2b, there is connected a rectifying-smoothing circuit having a diode D3, a choke coil L3, a flywheel diode D32, and a smoothing capacitor C3. A voltage across the smoothing capacitor C3 is provided as a third output voltage vo3 from a third output terminal.

In the multiple-output switching power source apparatus of the second embodiment, the first and second converters each are a forward converter and the first output voltage Vo1 to the third output voltage Vo3 are controlled like the first embodiment.

Figure 9:
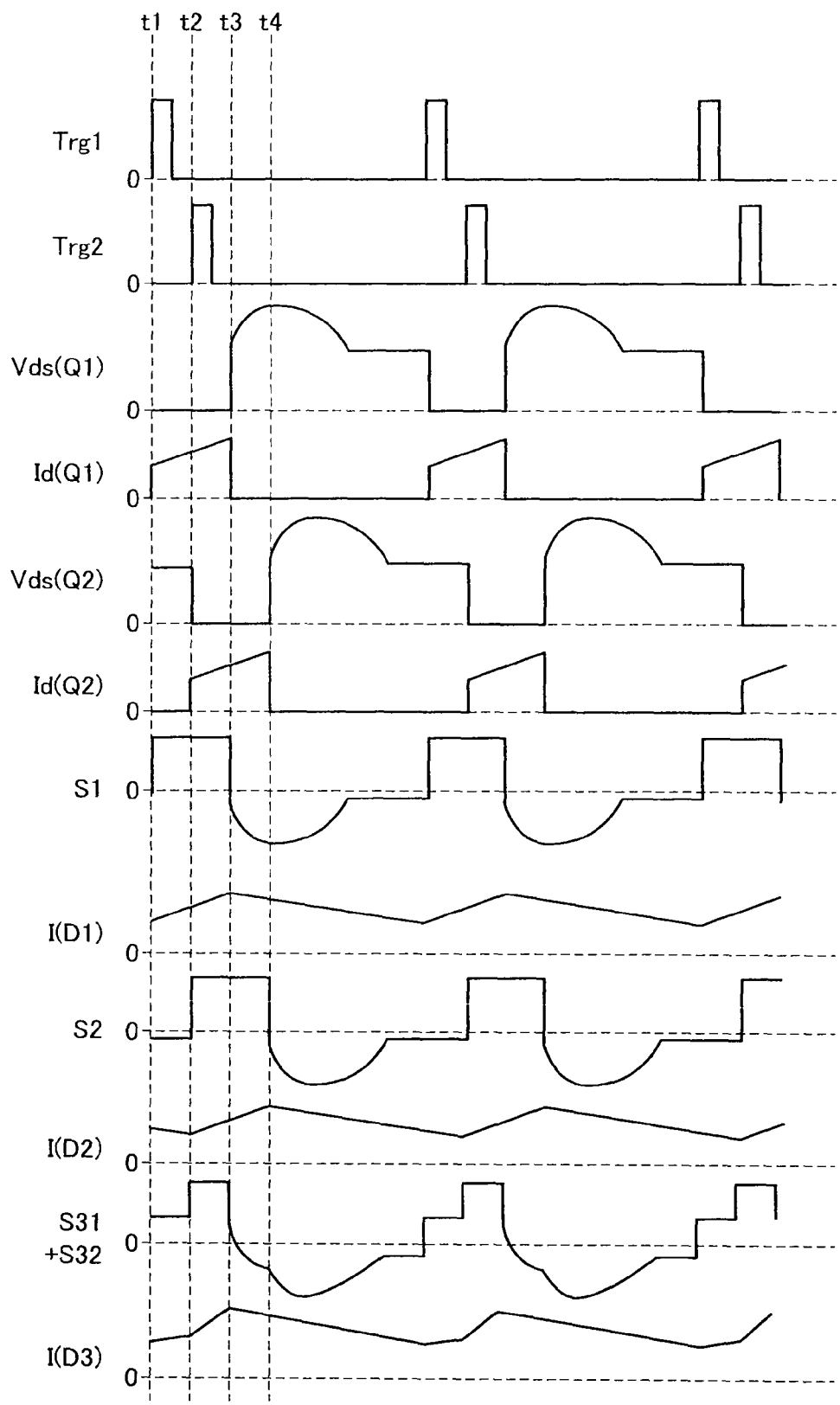
FIG. 9 is a waveform diagram illustrating operation of the multiple output switching power source apparatus according to the second embodiment of the present invention.

FIG. 9 is a waveform diagram illustrating operation of the multiple output switching power source apparatus according to the second embodiment of the present invention.

With reference to FIG. 9, operation under high load of the multiple output switching power source apparatus according to the second embodiment will be explained.

First, at time t1, a control circuit 12-3 provides a control circuit 12-1 with a trigger Trg1 as an ON trigger signal. Receiving the trigger Trg1, the control circuit 12-1 provides a gate terminal of a switching element Q1 with a gate signal.

Accordingly, the switching element Q1 turns on, the primary winding P1 of the transformer T1b receives a DC voltage Vin, and the first secondary winding S1 generates a voltage a winding ratio times the DC voltage Vin.

This voltage supplies energy through the choke coil L1 to the first output terminal and accumulates energy in the choke coil L1. At this time, the second secondary winding S31 of the transformer T1b also generates a voltage a winding ratio times the DC voltage Vin. However, a switching element Q2 is not ON, and therefore, the second secondary winding S32 of the transformer T2b generates no voltage. Alternatively, a negative voltage is generated to reset the transformer T2b, so that a voltage applied to the choke coil L3 is low and a current passing through the choke coil L3 little changes.

At time t2, the control circuit 12-3 provides a control circuit 12-2 with a trigger Trg2 as an ON trigger signal. Receiving the trigger Trg2, the control circuit 12-2 provides a gate terminal of the switching element Q2 with a gate signal. Accordingly, the switching element Q2 turns on, the primary winding P2 of the transformer T2b receives the DC voltage Vin, and a voltage a winding ratio times the DC voltage Vin is induced at the first secondary winding S2.

This voltage supplies energy through the choke coil L2 to the second output terminal and accumulates energy in the choke coil L2. At this time, the second secondary winding S32 of the transformer T2b also induces a voltage a winding ratio times the DC voltage Vin. The generated voltage and the voltage generated by the second secondary winding S31 of the transformer T1b are applied to the choke coil L3, so that energy is supplied through the choke coil L3 to the third output terminal and is accumulated in the choke coil L3.

At time t3, the switching element Q1 turns off, the voltage of the first secondary winding S1 of the transformer T1b reverses, the diode D1 turns off, and the energy accumulated in the choke coil L1 is discharged through the flywheel diode D12 to the first output terminal. At this time, the voltage of the second secondary winding S31 of the transformer T1b reverses to induce a negative voltage. Accordingly, the voltage on the anode side of the diode D3 becomes lower than the third output voltage Vo3, the diode D3 turns off, and the energy accumulated in the choke coil L3 is discharged through the flywheel diode D32.

At time t4, the switching element Q2 turns off, the voltage of the first secondary winding S2 of the transformer T2b reverses, the diode D2 turns off, and the energy accumulated in the choke coil L2 is discharged through the flywheel diode D22 to the second output terminal. Thereafter, the switching elements Q1 and Q2 keep the OFF state, the energy accumulated in the choke coils L1, L2, and L3 is discharged through the flywheel diodes to the output terminals, and the ON state of the switching element Q1 at time t1 resumes.

In this way, in the period in which both the switching elements Q1 and Q2 are ON, energy is discharged to the third output terminal and is accumulated in the choke coil L3. According to an error signal fed back from a feedback circuit 10-3, the timing at which the control circuit 12-3 provides the triggers Trg1 and Trg2 is shifted to adjust the period in which both the switching elements Q1 and Q2 are ON, thereby controlling the third output voltage Vo3. As results, the second embodiment provides an effect similar to that provided by the first embodiment. The control circuit 12-3 according to the second embodiment, may have the circuit configuration illustrated in FIG. 4.

Third Embodiment

Figure 10:
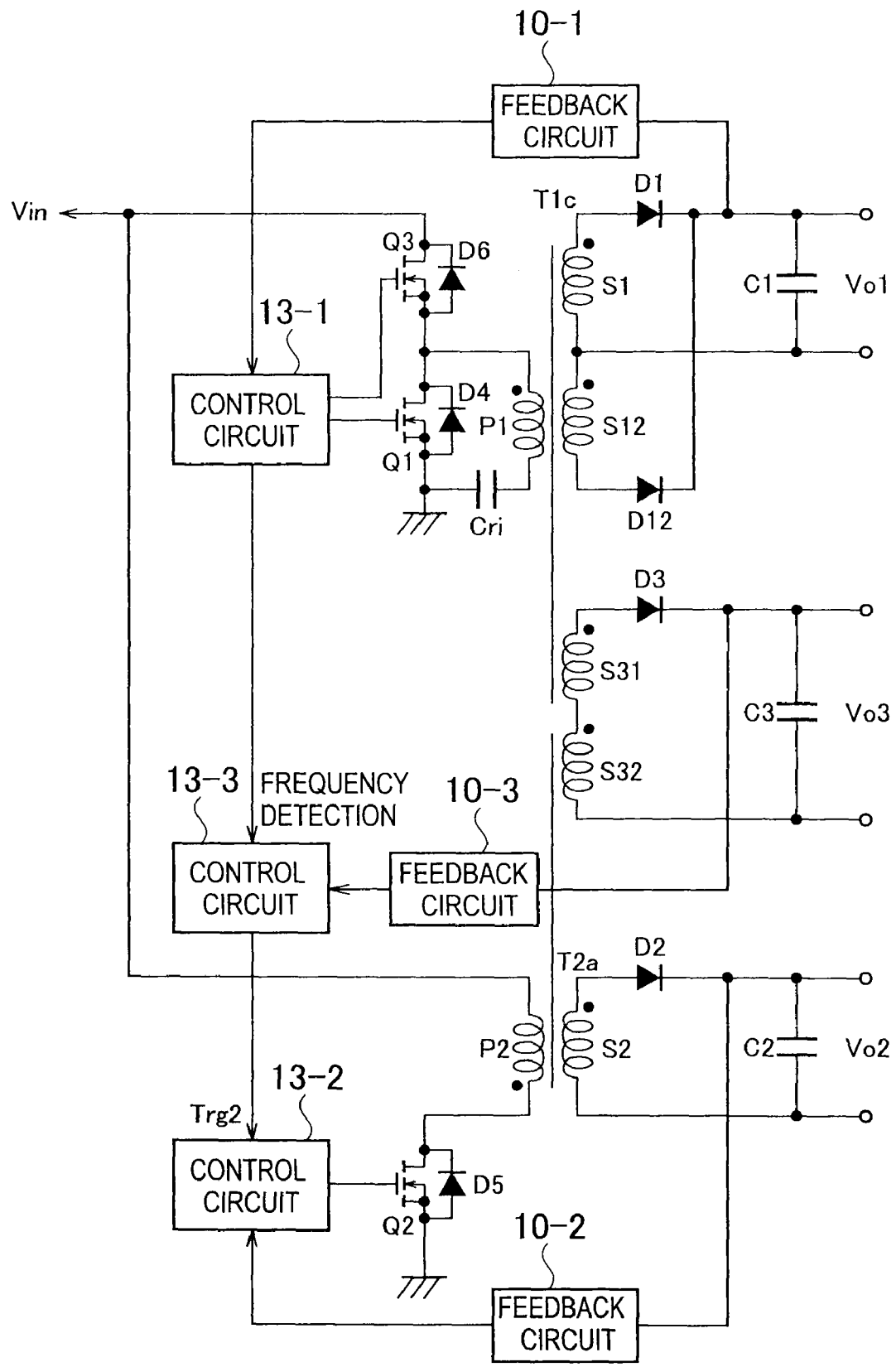
FIG. 10 is a circuit diagram illustrating a configuration of a multiple output switching power source apparatus according to a third embodiment of the present invention.

FIG. 10 is a circuit diagram illustrating a configuration of a multiple output switching power source apparatus according to the third embodiment of the present invention. The multiple output switching power source apparatus illustrated in FIG. 10 differs from the multiple output switching power source apparatus of the first embodiment illustrated in FIG. 3 in the below-mentioned configuration. Only the different configuration will be explained.

An input voltage Vin is connected to a series circuit including switching elements Q1 and Q3 made of, for example, MOSFETs. The switching element Q1 is connected in parallel with a series resonant circuit including a primary winding P1 of a transformer T1c and a current resonant capacitor Cri. A control circuit 13-1 alternately turns on/off the switching elements Q1 and Q3, to control a first output voltage Vo1 to a predetermined voltage.

On the secondary side of the transformer T1c, there are a first secondary winding S1 that is wound to generate a voltage whose phase is the same as that of a voltage of the primary winding P1 of the transformer T1c, a second secondary winding S12 that is wound to generate a voltage whose phase is opposite to that of a voltage of the primary winding P1, and a rectifying-smoothing circuit connected to the first and second secondary windings S1 and S12. The rectifying-smoothing circuit has diodes D1 and D12 and a smoothing capacitor C1, to rectify and smooth voltages induced by the first and second secondary windings S1 and S12 of the transformer T1c and provide a first output voltage Vo1 from a first output terminal.

In the multiple output switching power source apparatus of the third embodiment, the first converter to output the first output voltage Vo1 is a current resonant converter with the switching elements Q1 and Q3 alternately turning on/off at a duty of 50%.

A feedback circuit 10-1 feeds back an error signal between the first output voltage Vo1 and a reference voltage to the control circuit 13-1, which adjusts a switching frequency of the switching elements Q1 and Q3, thereby controlling the first output voltage Vo1 to a predetermined voltage.

A feedback circuit 10-2 feeds back an error signal to the control circuit 13-2, which adjusts an ON width of a switching element Q2 according to the error signal, thereby controlling a second output voltage Vo2 to a predetermined voltage.

A control circuit 13-3 receives from a feedback circuit 10-3 an error signal between a third output voltage Vo3 and a reference voltage, and according to the error signal, generates a trigger Trg2 (ON-timing control signal) to change the timing of turning on the switching element Q2.

Also, the control circuit 13-3 receives from the control circuit 13-1 a switching frequency signal to turn on/off the switching elements Q1 and Q3 and provides the control circuit 13-2 with the switching frequency signal and trigger Trg2. The control circuit 13-2 operates in synchronization with the switching frequency of the control circuit 13-1, and according to the trigger Trg2 from the control circuit 13-3, turns on/off the switching element Q2.

Figure 11:
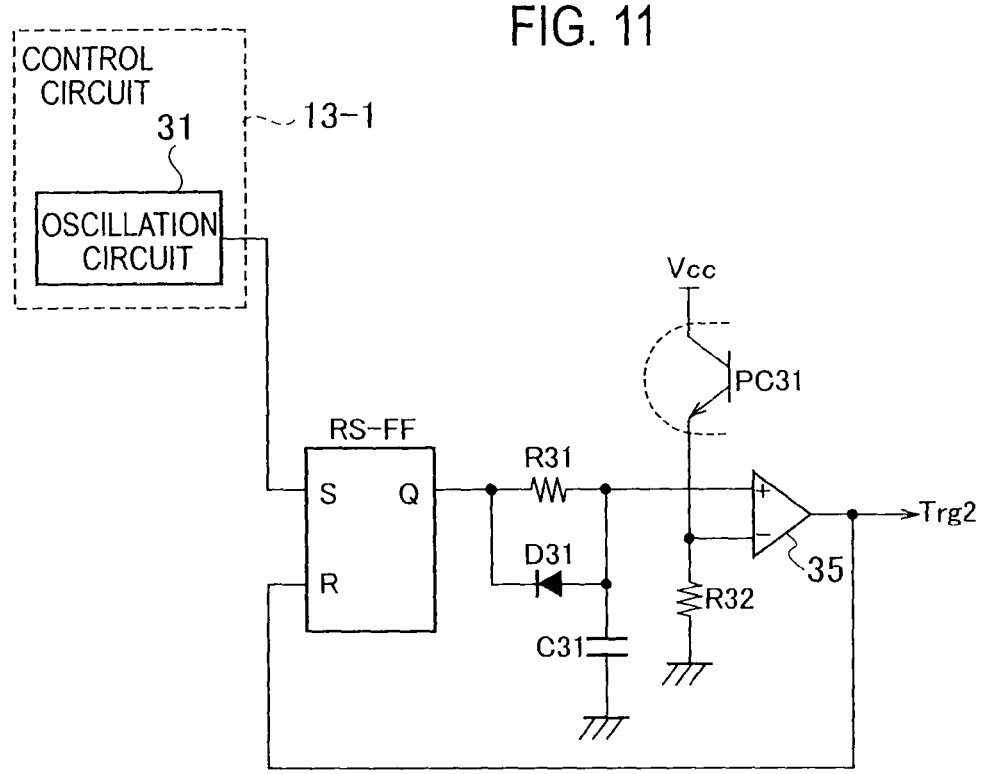
FIG. 11 is an internal circuit diagram illustrating a control circuit 13-3 of the multiple output switching power source apparatus according to the third embodiment.
Figure 12:
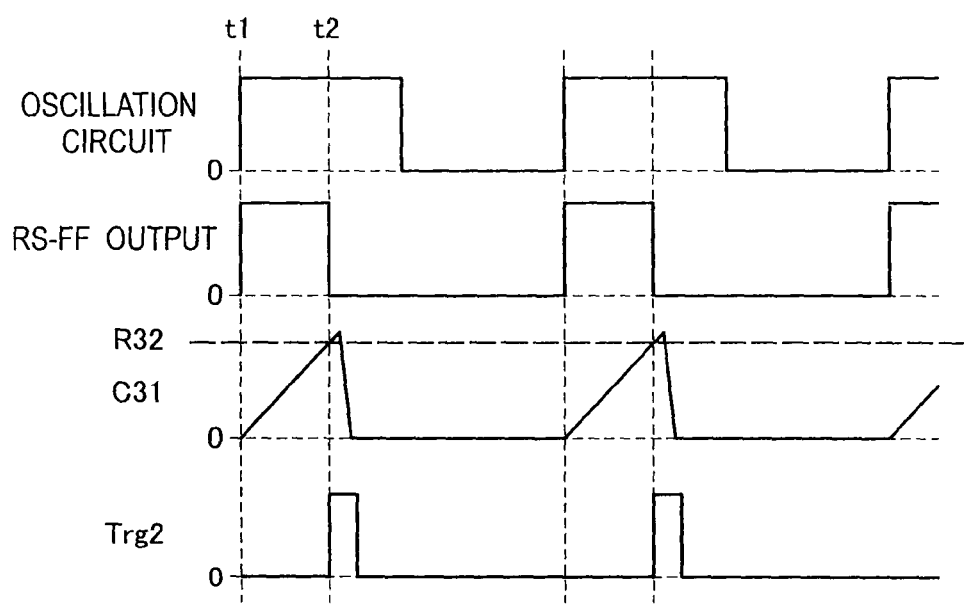
FIG. 12 is a timing chart illustrating operation of the control circuit 13-3 illustrated in FIG. 11.

FIG. 11 is an internal circuit diagram illustrating the control circuit 13-3 of the multiple output switching power source apparatus according to the third embodiment. FIG. 12 is a timing chart illustrating operation of the control circuit 13-3 illustrated in FIG. 11. In FIG. 11, the control circuit 13-1 has an oscillation circuit 31 to generate a pulse voltage at predetermined intervals for turning on/off the switching elements Q1 and Q3.

The control circuit 13-3 has a flip-flop circuit RS-FF, a resistor R31, a diode D31, a capacitor C31, a photocoupler PC31, a resistor R32, and a comparator 35. Namely, compared with the control circuit 12-3 illustrated in FIG. 4, the oscillation circuit 31 and one-shot-pulse generation circuit 33 are removed.

In such a configuration, the pulse voltage from the oscillation circuit 31 in the control circuit 13-1 rises at time t1 and the flip-flop circuit RS-FF becomes high level to start charging the capacitor C31. At time t2, the voltage of the capacitor C31 becomes equal to a voltage of the resistor R32 and the comparator 35 generates the trigger Trg2 and provides the same as an ON-timing control signal to the control circuit 13-2. The remaining operation is the same as that of the control circuit 12-3 of the first embodiment, and therefore, the explanation thereof is omitted.

Figure 13:
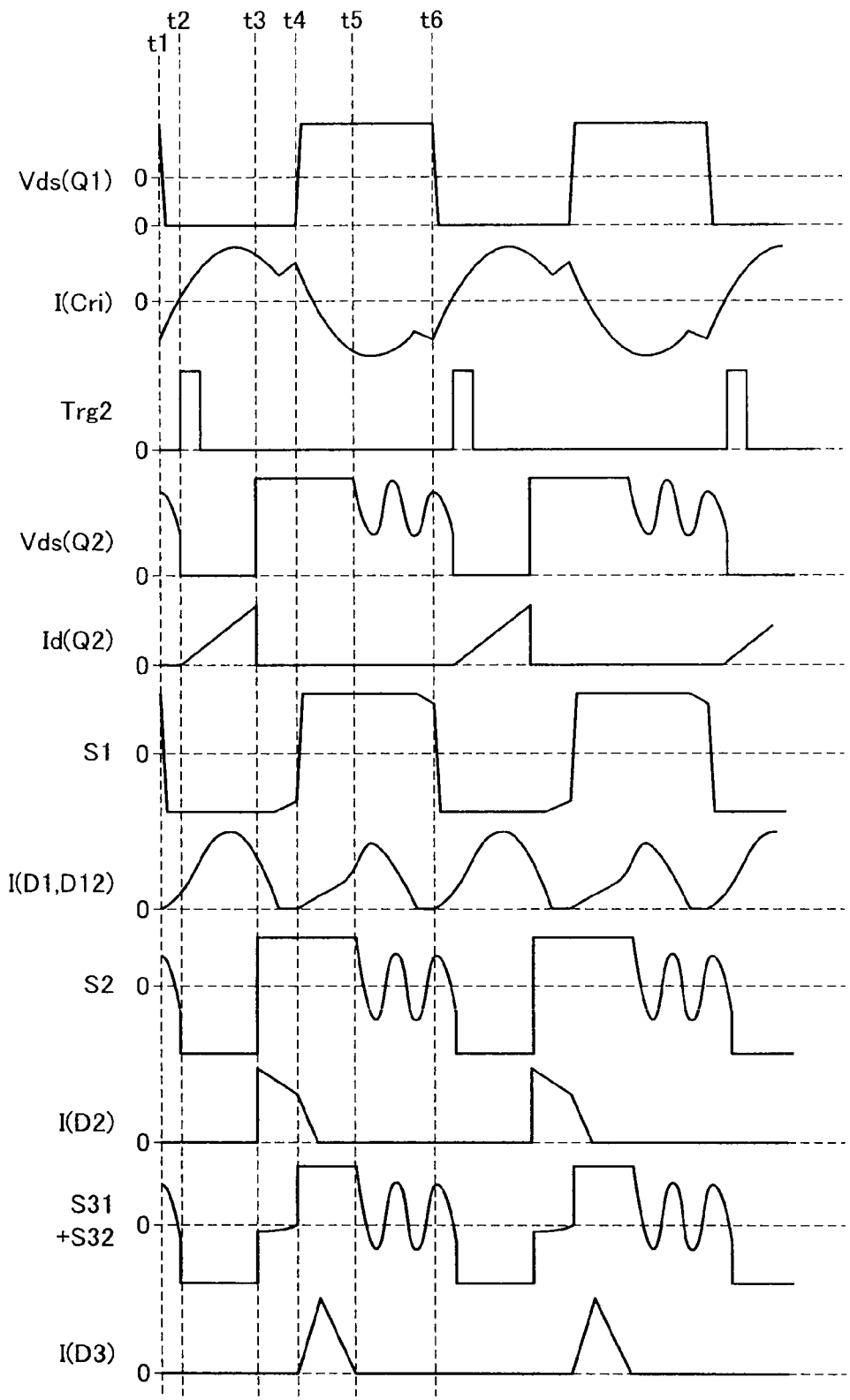
FIG. 13 is a waveform diagram illustrating operation of the multiple output switching power source apparatus according to the third embodiment of the present invention.

FIG. 13 is a waveform diagram illustrating operation of the multiple output switching power source apparatus according to the third embodiment of the present invention. In FIG. 13, I(Cri) is a current passing through the current resonant capacitor Cri, I(D1, D12) is a current passing through the diodes D1 and D12.

With reference to FIG. 13, operation under high load of the multiple-output switching power source apparatus according to the third embodiment will be explained.

First, at time t1, a gate signal provided by the control circuit 13-1 to a gate terminal of the switching element Q3 becomes low to turn off the switching element Q3. Thereafter, a gate signal is provided to a gate terminal of the switching element Q1, to turn on the switching element Q1.

Then, the voltage of the current resonant capacitor Cri is applied to the primary winding P1 of the transformer T1c, so that the first secondary winding S12 of the transformer T1c induces a voltage and a resonant current passes through the diode D12 and the first output terminal.

At time t2, the control circuit 13-3 provides the control circuit 13-2 with the trigger Trg2 as an ON trigger signal. Receiving the trigger Trg2, the control circuit 13-2 outputs a gate signal to the gate terminal of the switching element Q2 to turn on the switching element Q2 and pass an excitation current through the primary winding P2 of the transformer T2a.

At time t3, the switching element Q2 turns off, the voltage of the first secondary winding S2 of the transformer T2a reverses, and power is discharged through the diode D2 to the second output terminal. At this time, the voltage of a second secondary winding S32 of the transformer T2a also reverses. However, a negative voltage is induced at a second secondary winding S31 of the transformer T1c, and therefore, the voltage on the anode side of the diode D3 is lower than the voltage at the third output terminal, to discharge no energy to the third output terminal.

At time t4, the switching element Q1 turns off and the switching element Q3 turns on. Then, the primary winding P1 of the transformer T1c receives a differential voltage between the DC voltage Vin and the voltage of the current resonant capacitor Cri. This results in inducing a voltage on the first secondary winding S1 of the transformer T1c, to discharge a resonant current through the diode D1 to the first output terminal.

At this time, the voltage of the second secondary winding S31 of the transformer T1c reverses, so that the voltage of the second secondary winding S31 of the transformer T1c and the voltage of the second secondary winding S32 of the transformer T2a are added together. As results, the voltage on the anode side of the diode D3 becomes higher than the third output voltage Vo3, to discharge energy to the third output terminal.

At time t5, the discharge of energy accumulated in the transformer T2a ends and the voltage induced by the first secondary winding S2 of the transformer T2a gradually decreases. Then, the voltage on the anode side of the diode D3 becomes lower than the third output voltage Vo3 to turn off the diode D3. As a result, the resonant current from the transformer T1c is discharged through the diode D1 only to the first output terminal.

Thereafter, the discharge of the resonant current from the first secondary winding S1 of the transformer T1c ends, and at time t6, the switching element Q3 turns off and the switching element Q1 again turns on to resume the state of time t1.

In this way, like the multiple-output switching power source apparatus of the first embodiment, the multiple-output switching power source apparatus of the third embodiment discharges energy to the third output terminal in a period in which the voltage of the second secondary winding S31 of the transformer T1c and the voltage of the second secondary winding S32 of the transformer T2a each are positive. Accordingly, adjusting this period results in controlling the third output voltage Vo3.

More precisely, at time t1 for example, the control circuit 13-3 detects, according to a signal from the control circuit 13-1, a fall (corresponding to a rise of the oscillation circuit) of the drain-source voltage of the switching element Q1. Using time t1 as a reference, the control circuit 13-3 changes the timing of providing the control circuit 13-2 with the trigger Trg2 according to an error signal fed back from the feedback circuit 10-3. This results in adjusting the period in which the voltage of the second secondary winding S31 of the transformer T1c and the voltage of the second secondary winding S32 of the transformer T2a each are positive, thereby controlling the third output voltage Vo3.

Although the first embodiment has been explained in connection with a flyback converter, the embodiment is applicable not only to the flyback converter but also to any switching converter that conducts PWM control to control an output voltage. Although the second embodiment has been explained in connection with a forward converter, the embodiment is applicable not only to the forward converter but also to any switching converter that conducts PWM control to control an output voltage. Although the third embodiment has been explained in connection with a current resonant converter, the embodiment is applicable not only to the current resonant converter but also to any switching converter.

Although the first and second embodiments control the ON timing of the switching elements Q1 and Q2, the same effect will be obtained by controlling the OFF timing of the switching elements Q1 and Q2.

EFFECT OF INVENTION

According to the first technical aspect of the present invention, one transformer and one switching element can be removed from the three-converter multiple output switching power source apparatus of the related art. Accordingly, the multiple-output switching power source apparatus of the first aspect has an inexpensive circuit configuration and is capable of stabilizing outputs.

According to the second technical aspect of the present invention, the third control circuit uses an ON-timing control signal generated according to an error signal, to shift the timing of turning on the first and second switching elements, thereby adjusting a period in which the energy discharge periods of the first and second transformers overlap and controlling the third output voltage.

According to the third technical aspect of the present invention, the third control circuit uses an ON-timing control signal generated according to an error signal, to change the timing of turning on the second switching element, thereby adjusting a period in which the energy discharge periods of the first and second transformers overlap and controlling the third output voltage.

According to the fourth and fifth technical aspects of the present invention, ON-timing control signals are generated.

INDUSTRIAL APPLICABILITY

The present invention is applicable to multiple output switching power source apparatuses having a plurality of outputs.

(United States Designation)

In connection with United States designation, this international patent application claims the benefit of priority under 35 U.S.C. 119(a) to Japanese Patent Application No. 2007-170906 filed on Jun. 28, 2007 whose disclosed contents are cited herein.

The invention claimed is:

1. A multiple output switching power source apparatus, comprising:
    first and second transformers each at least having a primary winding, a first secondary winding, and a second secondary winding;
    a first control circuit configured to adjust a time for applying a DC voltage to the primary winding of the first transformer;
    a first rectifying-smoothing circuit configured to rectify and smooth a voltage induced at the first secondary winding of the first transformer and provide a first output voltage;
    a second control circuit configured to adjust a time for applying the DC voltage to the primary winding of the second transformer;
    a second rectifying-smoothing circuit configured to rectify and smooth a voltage induced at the first secondary winding of the second transformer and provide a second output voltage;
    a third rectifying-smoothing circuit configured to rectify and smooth a voltage across a winding circuit in which the second secondary winding of the first transformer and the second secondary winding of the second transformer are connected in series and provide a third output voltage;
    a first switching element to be turned on/off by the first control circuit;
    a second switching element to be turned on/off by the second control circuit; and
    a third control circuit configured to generate ON-timing control signals that change a time between the timing of turning on the first switching element and the timing of turning on the second switching element according to the third output voltage of the third rectifying-smoothing circuit, wherein
    the first and second control circuits turn on/off the switching elements at the same switching frequency according to the ON-timing control signals from the third control circuit.

2. A multiple output switching power source apparatus, comprising:
    first and second transformers each at least having a primary winding, a first secondary winding, and a second secondary winding;
    a first control circuit configured to adjust a time for applying a DC voltage to the primary winding of the first transformer;
    a first rectifying-smoothing circuit configured to rectify and smooth a voltage induced at the first secondary winding of the first transformer and provide a first output voltage;
    a second control circuit configured to adjust a time for applying the DC voltage to the primary winding of the second transformer;
    a second rectifying-smoothing circuit configured to rectify and smooth a voltage induced at the first secondary winding of the second transformer and provide a second output voltage;
    a third rectifying-smoothing circuit configured to rectify and smooth a voltage across a winding circuit in which the second secondary winding of the first transformer and the second secondary winding of the second transformer are connected in series and provide a third output voltage;
    a first switching element to be turned on/off by the first control circuit;
    a second switching element to be turned on/off by the second control circuit; and
    a third control circuit to generate an ON-timing control signal that changes the timing of turning on the second switching element according to the third output voltage of the third rectifying-smoothing circuit, wherein
    the second control circuit operates in synchronization with a switching frequency of the first control circuit and turns on/off the second switching element according to the ON-timing control signal from the third control circuit.

3. The multiple output switching power source apparatus according to claim 1, wherein the third control circuit has:
    an oscillation circuit configured to generate a pulse voltage at predetermined intervals;
    a first trigger generation circuit configured to generate a first trigger in synchronization with the pulse voltage from the oscillation circuit; and
    a second trigger generation circuit configured to generate a second trigger when a time period corresponding to the third output voltage of the third rectifying-smoothing circuit passes after the generation of the pulse voltage by the oscillation circuit, wherein
    as the ON-timing control signals, the first trigger is provided to the first control circuit and the second trigger to the second control circuit.

4. The multiple output switching power source apparatus according to claim 2, wherein:
    the third control circuit has a second trigger generation circuit configured to generate a second trigger when a time period corresponding to the third output voltage of the third rectifying-smoothing circuit passes after the first switching element is turned on or off; and
    the second trigger is provided as the ON-timing control signal to the second control circuit.

* * * * *

UNITED STATES PATENT AND TRADEMARK OFFICE
CERTIFICATE OF CORRECTION

PATENT NO. : 8,063,507 B2  
APPLICATION NO. : 12/442824  
DATED : November 22, 2011  
INVENTOR(S) : Yoichi Kyono Page 1 of 1

It is certified that error appears in the above-identified patent and that said Letters Patent is hereby corrected as shown below:

On the title page, Item (86), the PCT information is incorrect. Item (86) should read:

-- (86) PCT No.: PCT/JP2008/060982

§ 371 (c)(1),
(2), (4) Date: Mar. 25, 2009 --

Signed and Sealed this
Seventeenth Day of January, 2012

David J. Kappos
*Director of the United States Patent and Trademark Office*